United States Patent
MacLaughlin (10) Patent No.: US 9,256,855 B2
(45) Date of Patent: Feb. 9, 2016

(54) SYSTEM AND METHOD FOR PROVIDING A REFERRAL NETWORK IN A SOCIAL NETWORKING ENVIRONMENT

(75) Inventor: Edwin John MacLaughlin, Manhattan Beach, CA (US)

(73) Assignee: UTRUSTIT SOCIAL, INC., Hermosa Beach, CA (US)

( * ) Notice: Subject to any disclaimer, the term of this patent is extended or adjusted under 35 U.S.C. 154(b) by 554 days.

(21) Appl. No.: 12/777,248

(22) Filed: May 10, 2010

(65) Prior Publication Data

US 2010/0287282 A1    Nov. 11, 2010

Related U.S. Application Data

(60) Provisional application No. 61/215,675, filed on May 8, 2009, provisional application No. 61/280,124, filed on Oct. 30, 2009, provisional application No. 61/284,251, filed on Dec. 15, 2009, provisional application No. 61/336,655, filed on Jan. 25, 2010, provisional application No. 61/336,682, filed on Jan. 25, 2010.

(51) Int. Cl.
*G06Q 30/00* (2012.01)
*G06Q 10/10* (2012.01)

(52) U.S. Cl.
CPC ...................... *G06Q 10/10* (2013.01)

(58) Field of Classification Search
CPC ....... G06Q 50/01; G06Q 30/02; G06Q 10/10; G06Q 30/0217; G06F 17/30392; G06F 17/32; G06F 17/34
USPC .......................................... 709/226; 705/14.19
See application file for complete search history.

(56) References Cited

U.S. PATENT DOCUMENTS

| | | | |
|---|---|---|---|
| 2007/0192168 A1* | 8/2007 | Van Luchene | 705/10 |
| 2008/0005072 A1* | 1/2008 | Meek et al. | 707/3 |
| 2008/0140566 A1 | 6/2008 | Chowins | |
| 2008/0228598 A1 | 9/2008 | Leff et al. | |
| 2008/0255977 A1 | 10/2008 | Altberg et al. | |
| 2009/0063304 A1 | 3/2009 | Meggs | |
| 2009/0119167 A1* | 5/2009 | Kendall et al. | 705/14 |
| 2009/0125320 A1* | 5/2009 | Bickett | 705/1 |
| 2010/0125490 A1* | 5/2010 | Kiciman et al. | 705/14.1 |

OTHER PUBLICATIONS

International Search Report, Written Opinion, and Notice of Transmittal of same mailed Jun. 24, 2010 in International Application No. PCT/US10/034275.

* cited by examiner

*Primary Examiner* — Phuoc Nguyen
(74) *Attorney, Agent, or Firm* — Mahamedi Paradice LLP (57) ABSTRACT

A user-content generated network is provided for presenting business listings, as well as commentary and reviews of businesses, by participants of the network. In an embodiment, businesses can participate in the network and receive referrals from members of the network. The network can track and monitor referrals that individual businesses receive as a mechanism for promoting the business to other users in the network's user base.

19 Claims, 5 Drawing Sheets

SYSTEM AND METHOD FOR PROVIDING A REFERRAL NETWORK IN A SOCIAL NETWORKING ENVIRONMENT

RELATED APPLICATION

This application claims benefit of priority to the following: U.S. Provisional Patent Application No. 61/215,675, filed May 8, 2009; U.S. Provisional Patent Application No. 61/280,124 filed Oct. 30, 2009; U.S. Provisional Patent Application No. 61/284,251, filed Dec. 15, 2009; U.S. Provisional Patent Application No. 61/336,655, filed Jan. 25, 2010; and U.S. Provisional Patent Application No. 61/336,682, filed Jan. 25, 2010; all of the aforementioned applications being hereby incorporated by reference in their respective entirety.

TECHNICAL FIELD

Embodiments described herein pertain generally to a system and method for operating a social network, and more specifically, to a system and method for operating a referral network in a social networking environment.

DETAILED DESCRIPTION

Embodiments described herein enable formation of referral networks in a social networking environment.

According to some embodiments, a user-content generated network is provided for presenting business listings, as well as commentary and reviews of businesses, by participants of the network. In an embodiment, businesses can participate in the network and receive referrals from members of the network. The network can track and monitor referrals that individual businesses receive as a mechanism for promoting the business to other users in the network's user base.

As used herein, a user-content generated network is a network of interlinked network resources (e.g. web pages) that publish content generated from users of the network. As an example, a social network is a user-content generated network.

In an embodiment, the user-content generated network is operated as a social network, in that participants are provided a web page or other online resource, and enabled to link to other participants through their respective web page or online resource. In this context, referrals to business participants appear as referral links. In one embodiment, a person or other participant of the network (e.g. group or organization) is able to express a recommendation or endorsement of a business by creating a referral link to the business participant being recommended/endorsed. A referral link is a link data structure (e.g. URL) that is published on the user's web page or online resource, and it provides an expression or affirmation of a business by the person publishing the link. According to some embodiments, data from referral links can be tallied and analyzed in order to affect how information about businesses are listed or otherwise presented.

In an embodiment, a network resource is associated to an organization. The network resource provides a medium on which the organization can publish information about itself and/or its products or services. Each participant in a population of participants of a social network is associated with a corresponding network resource (e.g. web page). An organization is able to participate by requesting other participants (e.g. individual participants in the population who have a relationship with the organization, and/or other organizations), to link their respective corresponding network resource with the network resource of the organization. Information is stored that identifies (i) a plurality of organizations, (ii) individual participants in the population, and (iii) links between each of the plurality of organizations and individual users in the population and/or other organizations in the plurality of organizations, wherein the links between each of the plurality of organizations and the individual users include referral links.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a non-transitory computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Figure 1:
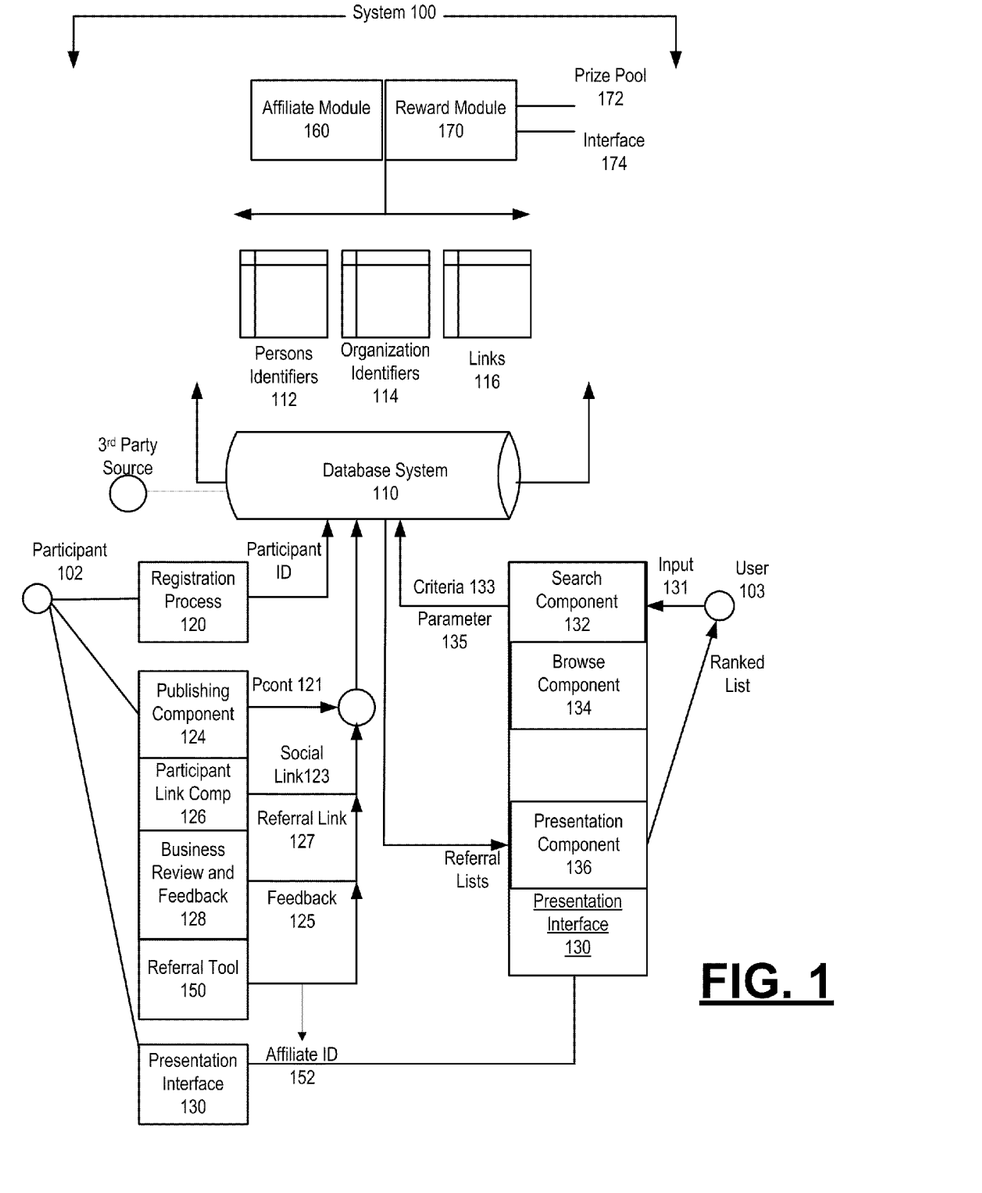
FIG. 1 illustrates a system for providing a referral network in a social networking environment, according to one or more embodiments.

FIG. 1 illustrates a system for providing a referral network in a social networking environment, according to one or more embodiments. More specifically, a system 100 such as shown by FIG. 1 enables participants to perform social networking activities, including (i) maintaining online resources, such as a webpage, (ii) using the online resource to publish and share information and content with other users, (iii) link to and/or from networks of friends, families, professional acquaintances and others, whom the user wishes to designate as part of their 'network'. In this context, embodiments provide the system 100 enables individual participants to make referral links to businesses and organizations.

Referral links include data elements or structures (e.g. URL links) that programmatically link a webpage or other online resource of the referral-making participant with the online resource/webpage of the party that is receiving the referral. Semantics and other content may be associated with the referral link in order to identify the party receiving the referral. The semantics and other surrounding content can serve to communicate that the link is being provided as an affirmative expression of referral. For example, the link can include one or more of the following semantic/contextual characteristics: (i) name of business displayed with link on user's online resource or page; (ii) name of business displayed with link in directory portion of user's online resource or page; and/or (iii) name of business displayed in prominence (e.g. highlighted, colored, bolded, enlarged, separated) from other links in the same region of the user's web page or online resource. In this way, the referral links enable individual participants to express recommendation or endorsement of a particular business or organization by linking an online resource of the endorsed/recommended business to the online resource maintained for the individual on the system 100.

The system 100 may be implemented as a Web service, such as provided at a website. In such implementation, the service can be implemented by a combination of computers (devices that include processors or processing resources), such as by servers that implement a client/server architecture. Alternatively, a peer-to-peer network or hybrid network infrastructure may be implemented. Still further, some embodiments may be implemented in connection with the existing social networking services. For example, a referral network aspect of embodiments described can be combined with existing social networking sites and services.

According to some embodiments, the participants of system 100 include persons and organizations. Organizations can include businesses, as well as associations, nonprofit organizations, or groups that share common interests (e.g. hobbyists) or other characteristics (e.g. neighborhood groups). In various embodiments, participants may also include additional classifications that include: registered and unregistered, premium participant (e.g. one who pays, or pays extra) and non-premium customer.

According to some embodiments, system 100 includes a database system 110 that manages structured relational data sets corresponding to persons identifier dataset 112, organizations identifier dataset 114, and linked to dataset 116. The individual datasets (e.g. table(s)) can form either a separate or integrated portion of another dataset. The persons identifier data set 112 includes information that identifies participants that are persons. This information may include the person's name, moniker, e-mail address, as well as demographic or personal information (e.g. sex and age), the interest of the user, and content that the person publishes or shares. The persons identifier dataset 112 may maintain such information, or include pointers or links to such information.

Likewise, the organization identifier dataset 114 includes or identifies information about businesses and organizations. This may include business name, the location or locations of the business, content about the business and/or the products or services offered by the business (e.g. product pictures of store or product), out-of-network endorsements of the products or business etc (e.g. Better Business Bureau approval, link to reviews at other websites). In some implementations, the information associated with participants (persons and organizations) is formatted as Web content and made renderable on a unique web resource that is assigned to that particular participant. The web resource of each participant forms a webpage (or portion thereof) that includes various pieces of content and information that are provided by that participant for others to view. The web resource can be uniquely identified by a URL or other identifier.

The link dataset 116 provides linking information between participants of the social/referral network provided with system 100. As mentioned, system 100 can enable a social networking environment, in which participants socially link to one another so as to be part of one another social network. Additionally, some embodiments enable participants to create referral links. Referral links can serve as expressions of endorsement or recommendation. The referral links can be provided as a direct link on a referring participant's online resource. When published on a referring participant's webpage, for example, the referral link locates the online resource or webpage of the participant that is receiving the referral. The link dataset 116 maintains the various links between participants of system 100.

System 100 includes a plurality of modules that combine to provide various functions and services, as described below by the various components, processes and other functionality. According to one or more embodiments, a participant 102 interacts with a registration process 120 to register with system 100. The participant's interaction with the registration process 120 includes specifying account information, including the name of the participant, login and password, preference designations, and contact information (e.g. email address). In the case where the participant 102 is a person, the participant 102 may enter demographic or profile information, such as the age and sex of the participant. In the case where the participant 100 is a business or organization, the participant 102 may identify and/or classify the business (tags, categories, sub-categories), as well as products and services offered by the business. Participants may also enter information about their preferences and privacy, such as who may view their webpage or specific information provided with their webpage. Various other preferences, settings, and information can be provided by participants 102 during the registration process 120. Information determined through the registration process may be recorded in the relevant persons or organizations data sets 112, 114.

Various user-interface features can be implemented on system 100 to enable activities such as content publishing and referral linking. In one embodiment, the user's interaction with system 100 may include (i) interaction with features provided with their personal web page or online resource, (ii) interactions provided with features provided as a global resources (e.g. search tool, home page), and/or (iii) features that one user can interact with on another participant's webpage or resource. Specific activities that can be enabled with the various features include (i) content publishing (e.g. linking to other content, publishing text authored by participant, uploading images and other media), (ii) referral linking, (iii) social linking, (iv) searching and (v) browsing. Specific examples of user-interface features include a text entry box, a menu, functional icons, search box, link generator, upload manager and preview tool. With regard to link generation, a link generator can be used to generate social and referral links, by creating links (e.g. URL) to a specified webpage or resource.

Subsequent to the registration process 120, the participant 102 can publish content using the publication component 124. Various types of information can be published by persons and/or businesses. Participants 102 can publish personal content 121 text, images, web content, multimedia, and other content in order to share information with their network and/or users of system 100. The personal content 121 can be published as a link to a source for the content, or as the content itself. Personal content 121 may also include social network links, including links to groups that participant 102 subscribed to or is a member of, as well as links to persons or other participants with whom participant 102 is socially linked to.

In addition to personal content 121, participant 102 can use a participant link component 126 to generate and publish social links 123 and referral links 127. Social links 123 correspond to links that enable a viewer of the particular webpage or online resource to open a corresponding webpage/resource of another participant with whom that person has a social or personal relationship with. Referral links are similar to social links, in that referral links can be selected to enable a viewer of the participant's page to see the webpage or resource of the participant identified by the link. But referral links can be presented differently from social links in that the participant is linking to a business or organization, the referral link is provided with context that indicates the person publishing the link is making an affirmative referral (or endorsement) of the business or organization that is identified by the link.

When generating a referral link, participant 102 identifies a business or organization that he or she wants to refer. In one embodiment, the link component 126 can include functionality provided on the participant's online webpage or resource, as well as functionality provided at the website or otherwise by system 100 independent of the participant's webpage or resource. The link component 126 operates to identify a participant business or organization from user input. The user may, for example, specify the participant business or organization by name, identify their webpage or online resource, or identify the business using a directory (e.g. one generated from the database system 110 for a category and/or geography specified by the user). Once the participant business or organization is identified, the link component 126 generates the link (social or referral) between the participant's page (the one making the referral) and the webpage or online resource of the participant that is being linked. The social and referral links 123, 127 can be stored or associated in the database system 110. When the social and referral links 123, 127 are generated, the publishing component 124 then publishes the social/referral links as part of the referring participant's online resource (e.g. web page).

In one implementation, referral links 127 are presented to semantically identify the business or organization, and include data (e.g. URL) that can be selected to programmatically link a particular participants web browser or application to the referred party's web resource (as hosted through system 100 or otherwise). The referral links 127 can be provided separate and apart from social links 123 in order to enable the participant who is making the referral link express his endorsement or recommendation of the business receiving the referral link.

As an addition or alternative, the referral links 127 can be published in the form of a business directory on the participant's page. A visitor of a given participant's page can easily see businesses that the given participant has linked to, conveying a level or endorsement or approval by the linking participant. For example, each participant 102 can maintain a directory page that includes referral links to businesses and organizations participant wishes to endorse or recommend.

The link data set 116 may maintain information generated from the link component 126. The link information includes social links 123 and referral links for individual participants.

Additionally, some embodiments enable participants to provide feedback 125 about businesses and organizations using a feedback component 128. The types of information that can be entered as feedback include quantitative recommendations, such as provided in paragraph form, and ratings (e.g. numeric ratings on a scale of highest/lowest). In some implementations, feedback 125 is associated with the business or organization that is also the participant of system 100. Thus, feedback 125 can be published on the publishing participants webpage, as well as accounted for (or published) on the online resource of the business/organization receiving the feedback.

Still further, the user may provide feedback 125 for a business or organization that is not a registered participant or user system 100. The system 100 may maintain information for nonparticipant businesses and organizations, particularly by way of reviews and other feedback.

A presentation interface 130 enables the participant 102 to view content provided by other participants. In particular, while some content provided by participants can be held private or closed to the public, other content provided on system 100 may be published for all participants, or alternatively, for all users (including non-participants, such as unregistered users). More specifically, the participant 102 can correspond to user 103 that is registered, or otherwise a subscriber of the service provided by system 100, in that the participant 102 can publish content and make referral links. In some embodiments, system 100 can be made available to users who are not registered, but have the ability to view content provided by participants 102 and/or other publishers of system 100. Thus, the user 103 may represent a participant (e.g. someone who has rights to publish and make referral links), or an unregistered user.

In one embodiment, presentation interface 130 includes a search component 132. The search component 132 receives input 131, corresponding to criteria 133 (information expressed by user) and/or search parameters 135 (information inferred from user or user input), from which it can search for and identify participants using the datasets of the database system 110. The search component 132 can be used to search for participants of all classifications, including persons, businesses, and/or organizations or groups. In one variation, search component 132 is used to search for businesses including businesses that are participants of system 100, as well as those who are not participants. To such end, the database management system 110 may also procure information from third-party sources, such as online directories, yellow pages, and other social networking sites.

For business searching, search component 132 users search criteria that specifies a classification, category, or subcategory of the business or product desired by user 103. For example, the user may specify a plumber as a classification for the business, or alternatively, the brand name the user desires for a finished plumbing product. The search criteria can also specify subcategories, such as, finished plumbing, residential plumbing, or commercial plumbing. Still further, search criteria can specify other characteristics that are specified by the user, including non-network recommendations or information such as provided by the Better Business Bureau or Consumer Reports. The user can specify various other inputs as criteria, such as whether the business satisfies equal opportunity employment criteria or standards. Another criteria that can be imported by the user is geographic location. The user may specify the geographic location of the business he is seeking, or system 100 may infer the geographic location as being one that is proximate to the known location of the user.

In addition to the use of search criteria and/or parameters, some embodiments enable search component 132 to perform referral searching. In referral searching, the user 103 is able to specify additional search criteria or parameters that pertain to criteria stemming from tabulation or analysis of referral links between businesses and referring participants. In one embodiment, referral searching enables the user 103 to specify criteria and/or search parameters for a business that is referred by a particular participant (e.g. a trusted friend or relative of user 103) or class of participants (e.g. all participants in the user's social or referral network).

In one embodiment, the user can perform a referral search by searching for a business on another participant's online resource or directory. More specifically, each participant's webpage includes referral links to a set of businesses or organizations. The user 103 can search for a type of business (e.g. plumber) from the given participants webpage, so as to view businesses that are of the specified type and which have referral links on the given participant's page.

As an alternative or variation, the user may specify the participant and search parameter from the main page of system 100, or another user's participant page, for a business of a particular type. Still further, the user may specify a class of participants (e.g. those participants that are part of the user's network; those participants that are part of the user's network and in the user's geographic zone) and the type of business in order to identify businesses of the specified type that have received referral links from the class of participants identified by the participant.

In addition to search component 132, the browsing component 134 enables the user to browse various businesses, organizations and other participants by classifications, categories, and tag such as those specified by search terms. Thus, for example, the user can browse for businesses by type, geographical area, and other classifications or categories.

According to some embodiments, the presentation component 136 enables search results and category listings (such as provided for browsing) to be displayed to the user with information that reflects referral linked data. More specifically, the information may be presented to the user to reflect a ranking or prioritization, as determined by referral link data. As described elsewhere, referral link data can incorporate a tally of referral links to a given business, as well as consideration of who provided the referral link.

In some embodiments, the presentation component 136 lists businesses in response to search results or browsing activities. The lists can be ranked or prioritized using parameters that are based on referral links. For example, for a given list, businesses may be ranked according to factors, such as one or more of: (i) a number of businesses that received referral links to participants of system 100; (ii) a number of businesses that received referral links to participants that are in a social sub-network of the particular user viewing the ranked list; (iii) a number of businesses that received referral links to participants that are in a geographic region of the user viewing the ranked list; and/or (iv) businesses, optionally classified by category or parameter, ranked by which has the most referral links.

As an addition or variation to ranking, the referral link data may be tabulated or otherwise listed to users as a means of providing additional information about the business.

The presentation component 136 may present the ranked list in different ways. In one embodiment, a business or organization having the highest ranking (e.g. highest tally of referral links) is provided the most prominent position in the list-usually the top position of the list, with succeeding lesser rank entries being positioned in descending order from the highest position. In another embodiment, the ranking, as determined by referral links, are presented in prominence with graphics and/or other features, such as tallying or underlining the business that has the most referral links (or most referral links from the user's network etc.) in a list. Still further, some embodiments provide for providing tallies, or counts of the number of referral links, for each business. Such values provide a mechanism for ranking individual businesses on a list, by displaying a ranked value that is based on the businesses referral links as part of the list entry for that business.

According to some embodiments, information maintained by the database system can be used for various commercial and business applications. These include, for example, reward programs, promotions, and market survey projects. In some embodiments, an affiliate program may be implemented on system 100 to spur growth and use of a service provided by system 100. In one embodiment, a registration tool 150 is published on individual users web page or resource. The registration tool 150 can be operated by users who want to register or otherwise become a participant of the service 150. The registration tool 150 prompts, or influences a user at a particular participants web page or resource to register. When this occurs, the participant who provided the registration tool 150 is given credit for the new participant's enrollment. Other mechanisms for crediting enrollment of new participants to existing participants may also be used. For example, whenever a new participant enrolls, he may be asked who referred him to the service, and his answer may be used to identify the participant who is to be provided credit.

Various services to promote network interactions and growth, as well as business opportunities and network revenue can be integrated with functionality described with embodiments of FIG. 1.

In one embodiment, an affiliate program 160 executes on data that identifies which participants are credited for enrollment of other participants. In particular, the affiliate program may reward participants for revenue generated from other participants that they directly refer, as well as for revenue from participants referred by those participants who were directly referred (i.e. two tiered). One implementation of an affiliate program is described with an embodiment of FIG. 6 and accompanying text.

A reward module 170 may also be integrated with system 100 to promote activity by participants and users. A detailed description of various reward programs that can be implemented with reward module 170 are described in greater detail below.

Methodology

Figure 2:
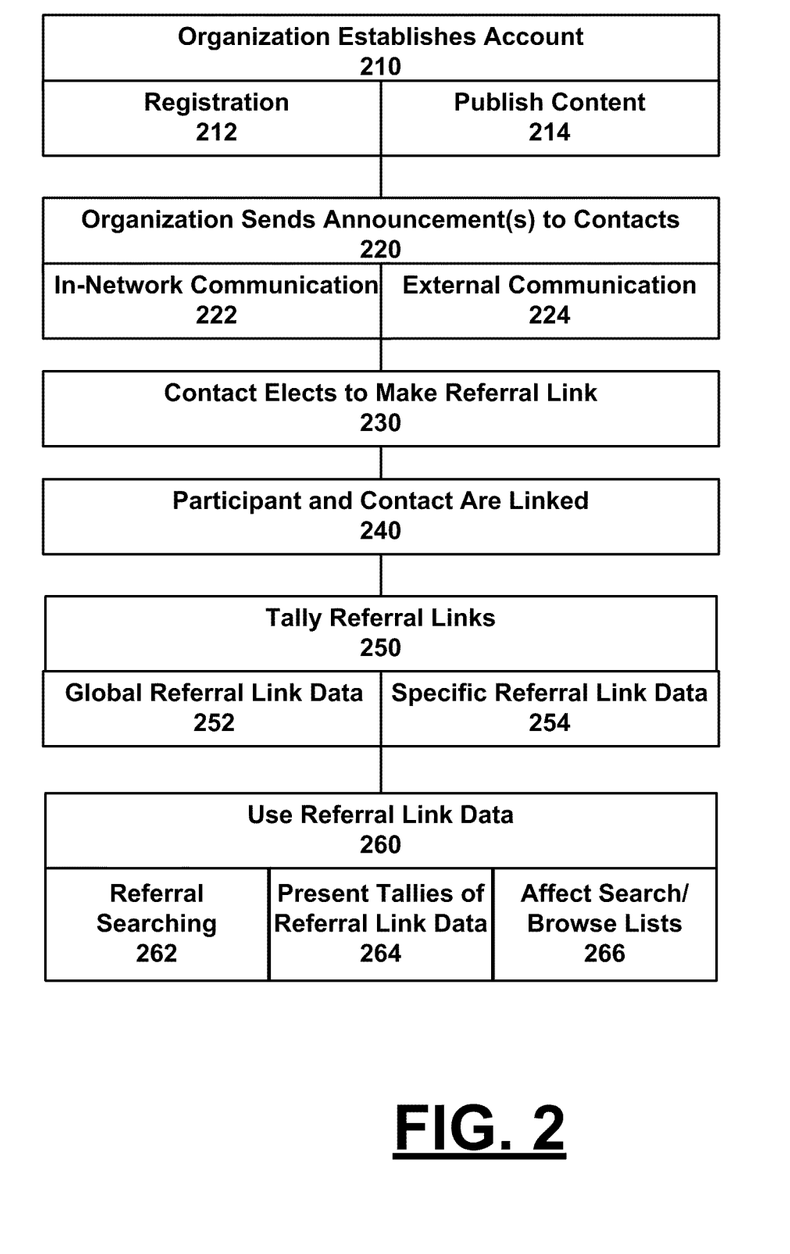
FIG. 2 illustrates a method for enabling a business to establish referral links with participants of a social network, according to one or more embodiments.

FIG. 2 illustrates a method for enabling a business to establish referral links with participants of a social network, according to one or more embodiments. A method such as described by FIG. 2 may be implemented using components such as described by an embodiment of FIG. 1. Accordingly, reference is made to elements of FIG. 1 for purpose of illustrating suitable elements or components for performing a step or sub-step being described.

In an embodiment, an organization establishes an account with the social network that is sustained on system 100 (210). The organization can correspond to the business, in association, or a non-structured affiliation (e.g. persons who share a common interest or hobby). For purpose of providing an example, in describing an embodiment of FIG. 2, the organization is assumed to be a business, and more specifically, a store or other small business that is local to a particular neighborhood or town. An operator of the business may interact with the registration component 110 in order to establish an account (212).

As an addition or variation, the business may also publish content (214) that promotes or provides information about the business and its products. For example, the web content may include text, pictures, media and links to products/services offered by the business, including online catalogs, lists of services offered and/or prices, and menus.

Once the organization is a participant of system 100, the organization may send announcements to its customers and/or associates or contacts (220). The announcement may invite the receiver of the announcement to make a referral link over the system 100. The communication can be sent through communication mediums offered through system 100 (e.g. in-network messaging service) (222), as well as through external communication mediums such as emails (224).

A person or organization that receives the communication from the business can elect to make a referral link (230). If the contact (person or organization) is already a participant of system 100, the participant simply uses functionality provided with the service to establish a link between that contact's webpage and the business that sent out the announcement. The referral link that is generated is published on the contact's webpage, as provided through system 100. The contact can, of course, elect to not link to the business that sent out the announcement.

If the contact who received the announcement is not a participant of system 100, the contact can elect to become a participant of the social network provided through system 100. For example, the contact may complete the registration process and become a participant. Then the contact can make the referral link on his or her respective web page or resource.

System 100 then associates the referral link with the organization who requested the referral link (240). The presence of the referral link has a variety of applications with system 100. According to some embodiments, data derived from referral links is used to enable participants to search, browse and/or view businesses that they may want to use.

In one embodiment, for the business or organization that receives referral links, the total tally or count of the referral links can be determined (250). The tally can consider referral links globally (252), as well as relationally or by categorically in order to generate user specific referral link information (254).

The referral link data can then be used in various forms (260). In one embodiment, the referral link data is used for referral searching (262), in order to search and identify businesses or organizations by classification (e.g. business type) and other criteria, as well as by information that is about referral links (e.g. those businesses that have threshold number of referral links, most referral links of a category, or who have been referred by a particular person or class of persons etc.).

Other uses for referral link data include tallying referral link data (globally, or specific to a given user) and presenting tallies of a given business participant's referral link data to another participant (264).

Still further, search or browsing lists can be affected with determination and/or presentation of the referral link data (266). For example, such lists can be ranked based in part on the referral link data. As a variation, select entries can be placed in prominence, or the list of entries can be enhanced with tabulation and co-presentation of the referral link data.

As an alternative or variation, the presence of the referral link enables referral searching features for the business or organization that receives the referral link. Under referral searching, a user (participant or unregistered user) can specify, as an additional search criteria or parameter, information that is specific to the business's referral links. Specific examples include (i) a person or persons who have referral links to the business or organization, (ii) a tally or count of the number of participants that have referral links to the business.

As still another variation, data pertaining to a business's referral links can be incorporated into how the business is listed by category or classification for browsing activities of individual users. For example, a participant person who is browsing for services may be presented businesses in their region that have the highest number of referral rakings.

Numerous other variations for incorporating referral linking into searching and/or browsing activities of users of system 100 exist.

The following provides an example of how embodiments such as described with FIG. 2 can be implemented the network is configured to enable a business, which for this example will be "Joe's Plumbing" (a plumbing company, which may be a sole proprietorship or larger company), to sign up for a personal directory page on the Referral Network. In one embodiment, the personal directory page signup is free, so that Joe's Plumbing can sign up and set up its personal directory page without cost. Joe's Plumbing can then go to its friends, customers, fellow business, other associates, etc., and ask them to go to the referral network and to: (1) visit the "Joe's Plumbing" webpage (i.e., personal directory page); (2) sign up for the referral network (which can be for free); (3) rate and/or review "Joe's Plumbing"; (4) to make "Joe's Plumbing" their personally preferred plumber; and/or (5) to list "Joe's Plumbing" in their personal directory (e.g. see FIG. 5). In one embodiment, the selection of "Joe's Plumbing" as a registered user's personally referred plumber will happen automatically if the registered user has signed up/registered as a participant of a service provided through system 100, through Joe's Plumbing's personal directory page (see e.g. an embodiment of FIG. 6). In another embodiment, the participant has the option to select whether "Joes Plumbing" will be its "Personally Referred" plumber or just be listed in the participant's directory page.

Figure 3:
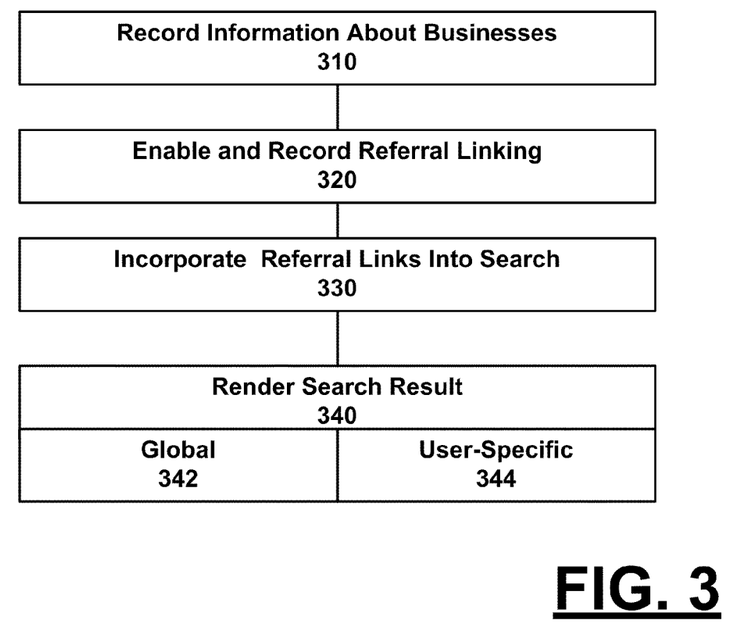
FIG. 3 illustrates a method for performing referral searching, according to an embodiment.

FIG. 3 illustrates a method for performing referral searching, according to an embodiment. A method such as described by FIG. 3 may be implemented using components such as described by an embodiment of FIG. 1. Accordingly, reference is made to elements of FIG. 1 for purpose of illustrating suitable elements or components for performing a step or sub-step being described.

The system 100 records information about businesses and organizations (310). In one embodiment, the system 100 may determine information about businesses/organizations from the businesses/organizations registering to become participants of system 100. During a registration process, a participant/business specifies information that includes the type(s) of products or service offered, the location(s) of the business, and other information that enables the participant's business to be classified. As an addition or variation, the system 100 uses third-party business directories and sources to gather and organize information about persons.

Subsequently, as described by an embodiment of FIG. 2 and elsewhere, referral links are enabled and recorded on system 100 (320). The database system 110 records data about referral links, so that the referral links made for each business are known and tabulated.

The referral links recorded in system 100 are then incorporated into search operations for businesses (330). In referral searching, a user enters some input that indicates their desire for locate a business of a particular type and/or classification. From this input, the search component 132 determines search criteria and parameters. For example, the user may wish to locate a local business, such as a plumber, or a non-local business, such as a mortgage broker. In order to find a plumber, the user may provide criteria or terms to classify the business (e.g. "plumber") or the problem they are having ("clogged drain"). The person may specify their location, or alternatively, system 100 may infer the user's location based on information known about the user. In order to find the mortgage broker, the user may look to, for example, "refinance" or find an "equity loan".

The search component 132 supplements the search criteria with parameters that utilize data determined from referral links. The data can be used to (i) filter our search results, by for example, eliminating or hiding search results that lack a threshold minimum of referral links; (ii) sorting or ranking search results based on businesses/organizations that have the most referral links.

In this way, search results that incorporate referral link data are generated (340). Data from referral links can be global (342) or user-specific (344). Global referral link data incorporates all referral links for businesses that otherwise match the search criteria. User-specific referral link data, on the other hand, is made specific to the user or the user's search or browsing experience. As examples, user-specific referral link data can affect a search result by ranking or otherwise identifying businesses that are (i) referral links of persons that are in the social network or community of the person performing the search; (ii) referral links from a particular participant, such as one that the searcher is relying on or trusts (e.g. searcher may know that a friend is undergoing a remodel, and may want to use the friend's referrals because the friend is deemed a good source); and (iii) referral links from a defined set of participants of system 100, such as from the user's specific social network (as known by, for example, the linked data set 116).

Search Results

Figure 4:
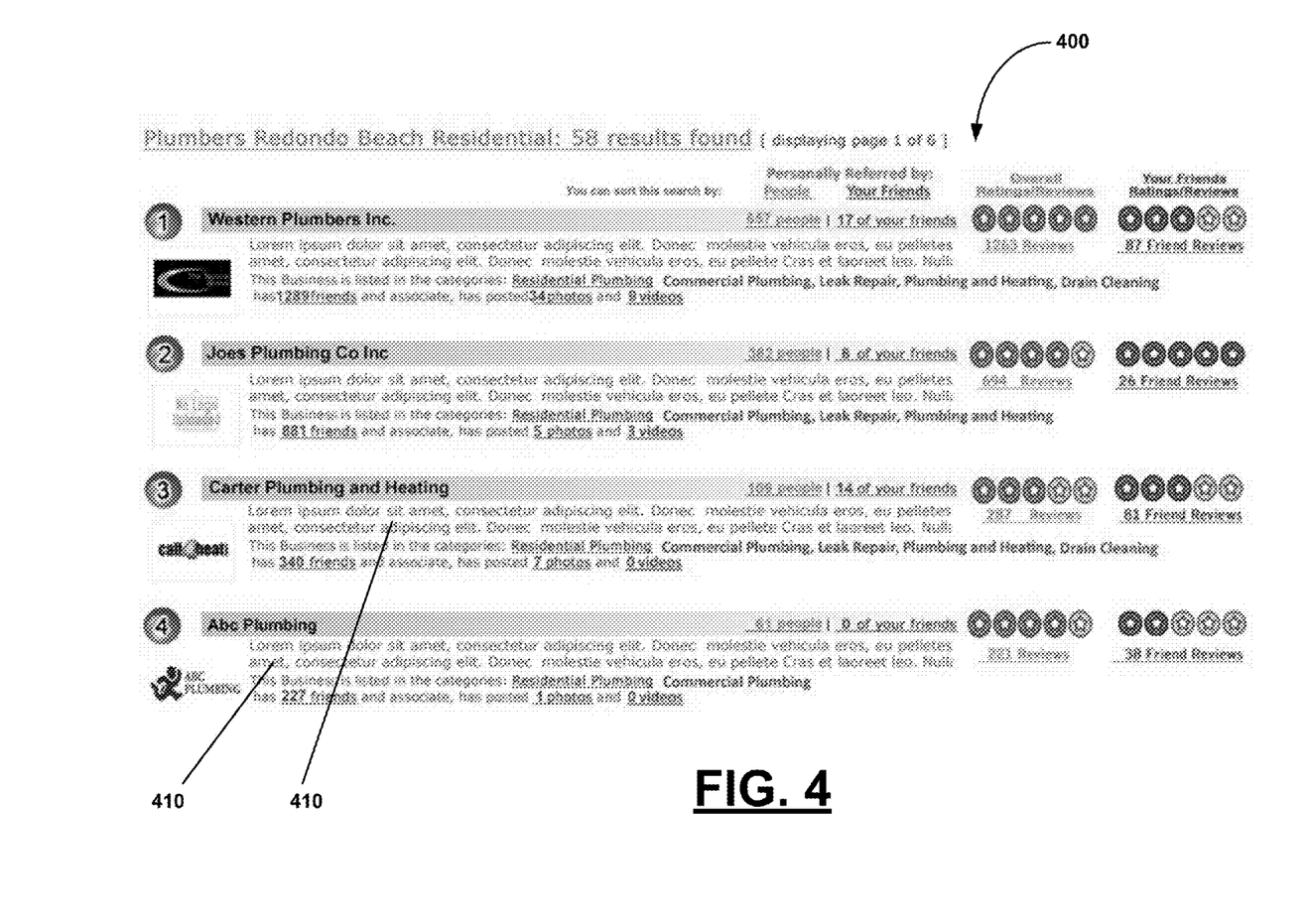
FIG. 4 illustrates a search result that is generated for a user seeking to locate a business, in accordance with various embodiments described herein.

FIG. 4 illustrates a search result that is generated for a user seeking to locate a business, in accordance with various embodiments described herein. More specifically, a search result 400 can be generated using functionality such as described with an embodiment of FIG. 1, and further presented by other embodiments described above. With reference to FIG. 4, search result 400 includes entries for 410 which are deemed to satisfy a search result (e.g. 'plumber') of a user. The geographic location of the search area (e.g. Redondo Beach) can be specified by the user, or inferred based on a known location of the user.

In an embodiment, the individual entries 410 each identify a business that is deemed to match search criteria presented by the user (e.g. 'plumbers' and 'Redondo Beach'). As such, the individual entries 410 include paragraph summaries or other descriptions of the represented businesses, as well as links to additional information about each of the businesses.

The search result is enhanced, however, in that the businesses are presented with information that is based on referral links. Two types of referral link information are shown with each search result: (i) global referral link data, which incorporate referral links by all participants of system 100; and (ii) user specific referral link data, which is specific to the user. In the latter case, the example provided shows referral links made by 'friends' of the user performing the search, for the business identified by the individual entries.

The 'friends' may correspond to, for example, one or more of the following: (i) participants that are directly linked socially or otherwise to the searcher through system 100, (ii) participants that are directly linked socially or otherwise to the searcher through another social networking environment, (iii) participants that are linked by more than 1° of freedom to the searcher (e.g. friend of social link), (iv) participants who share a common characteristic with the searcher, such as geography or membership to a particular organization or business, and/or (v) participants who were part of the same community, neighborhood, or deemed to have demographic similarity to the searcher. Accordingly, the term 'friends' is very example specific. Rather, what is conveyed is that referral link data can be modified or analyzed to be specific to the particular participant performing the search.

In addition to referral link data, embodiments such as shown by FIG. 4 may also incorporate or integrate ratings. Ratings and other feedback about businesses may be recorded through use of feedback component 128. In addition to ratings, individual businesses may have reviews, which can also be recorded through use of feedback component 128. The rating information provides another mechanism to rank, filter, and sort entries 410 in the search result 400. Thus, according to at least some embodiments, the search result for business/organizations may integrate criteria matching (e.g. terms specified by the user), geography information, global referral link data, user specific referral link data, and/or ratings (and other feedback).

In an embodiment, the referral link data (both global and user-specific) is tabulated or tallied for the user, and presented as an active link. In one embodiment, the user can select the tally of the respective global or user specific referral link data in order to see information about the specific individuals who have a referral link to the particular business of the entry 410.

Likewise, their ratings and reviews may also be tabulated or tallied, and presented as inactive link. The user can also select the rating tally to view information about particular individuals who have rated the business of the entry 410. In particular, some embodiments sort of highlight ratings and reviews provided by individuals that are socially linked in system 100 to the user performing the search. The ratings and reviews can also be segmented to show those ratings/reviews made by participants that, for example, are socially linked to the searcher through other social networking environments, that share geographic or demographic classification with the searcher, or whom are otherwise determined to be relevant to the person performing the search.

While an embodiment of FIG. 4 is described as being specific to presenting a search result, similar lists can be generated to provide to users for browsing activities. For example, a user may browse for businesses, select plumbers, and then view a list such as shown by an embodiment of FIG. 4.

Personal Directory Page

Figure 5:
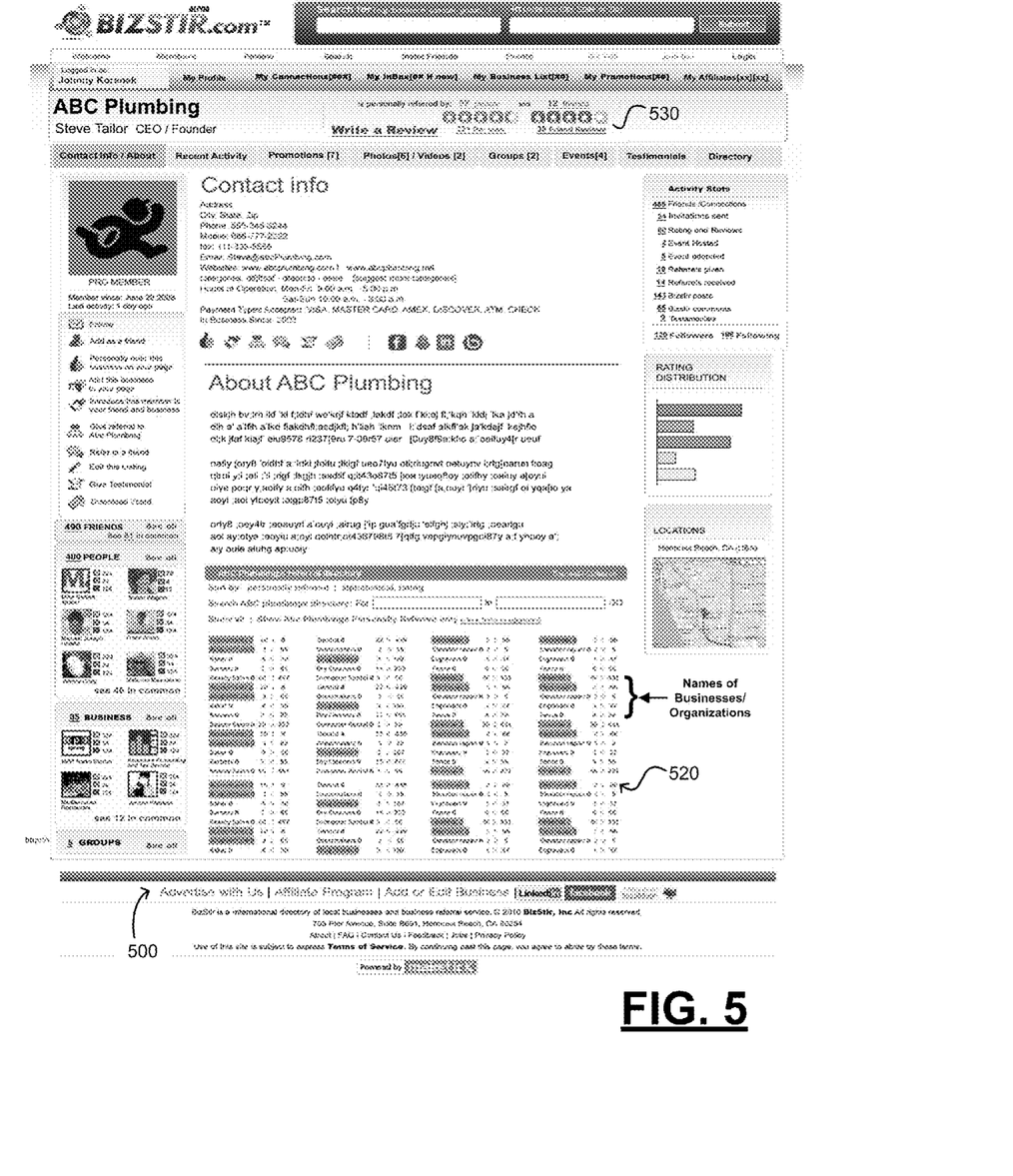
FIG. 5 illustrates a personal directory page that can be maintained for a participant of system 100, according to one or more embodiments.

FIG. 5 illustrates a personal directory page that can be maintained for a participant of system 100 (see FIG. 1), according to one or more embodiments. More specifically, a directory page 500 can be generated using functionality such as described with an embodiment of FIG. 1, and further presented by other embodiments described above.

As shown by FIG. 5, a personal directory page 500 can correspond to the webpage or online resource that is assigned and maintained for each participant of system 100. Thus, in one embodiment, when a participant registers, the participant is assigned a webpage (or functionally equivalent resource) that publishes information and other content specified by the participant. The participant can correspond to a person, whereas in the example shown, the participant corresponds to a business. The directory page 500 presents personal information about the participant, including the name of the participant and, in many cases contact information. For example, the case when the participant is a business, the contact information can list the address, fax number, e-mail, and various other information for enabling users of system 100 to contact and transact with the business.

In addition to personal or contact information, directory page 500 can include content that the participant elects to publish. In the case of a person, published content can include thoughts (e.g. micro-blog entries), shared content (links to online video), and uploaded images and media. For participants that are businesses, the published content can be, for example, promotional, informative or descriptive about the business and/or the products and services offered by the business.

In addition to publish content, the personal directory page 500 may publish the participants referral directory 520. The referral directory 520 list all businesses (or organizations) that the particular participant has elected to display, including those businesses that the participant wishes to express as a referral or recommendation (e.g. those shown in green). In the example shown, the referral links 522 are present in an active (i.e. selectable) text entries of business names. Referral links 522 may be presented in more than one level of prominence. For example, the directory portion 520 may include (i) businesses that the user wants to recommend above all others (by type or otherwise); (ii) businesses that the user is 'friends' with, or recommends, but less affirmatively than those that he is recommending. Still further, as described with one or more embodiments, some businesses may pay or engage in premium services in order to be listed in the directory page 520 of individuals. Accordingly, some referral links 522 may identify those businesses that the user affirmatively expresses a recommendation, or a highest recommendation, for-as shown by highlighted links 522. Other forms of prominence may also be used, including enlarging recommended links 522 above other business links (or less recommended links), using formatting or separating links for businesses based on recommendation or recommendation level.

A user can select a name from the directory 520 in order to open, or otherwise render the referred business' online resource are directory page.

In addition, viewers of directory page 500 can perform a search on the directory 520. Such a search may implicitly implicitly a referral search, in that the businesses that are identified from the directory are those that the participant of the page 500 has included in his or her directory.

The business participants ratings and feedback into presented on the directory page as well. Rating information can be summarized, and tabulated, in a manner such as described with an embodiment of FIG. 4. In one implementation, the overall rating of the business participant can be tabulated and published. For example, the overall rating may be provided by various participants through feedback component 128. Likewise, reviews (e.g. qualitative descriptions) of the particular business can be listed or summarized for the business.

In some embodiments, information about the participant businesses ratings, reviews, and referral links can be configured for the viewer of the directory page 500. In one embodiment, each directory page 500 includes a summary portion 530, that includes data items that are dynamic and specific to the user viewing the page 500. More specifically, the data items made correspond to the businesses ratings by various individuals, as well as the referral link data of the business. In an embodiment, summary portion 530 is displayed as a graphic that indicates (i) ratings from all persons who rated the business, (ii) ratings from participants who are linked or deemed friends of the person viewing the page, (iii) referral links from all users, and (iv) referral links from participants that are friends (or socially linked to) persons who view the page.

As described previously, both types of data items can also be made user specific to a person that is viewing the information. The viewer of the directory page 500 may be shown data that separately indicates or summarizes ratings or referral link data from individuals that are (i) expressly and directly linked to the viewer (e.g. via the social network or through another social network), (ii) indirectly linked to the viewer (e.g. linked to a friend of a friend), (iii) share a common locality or geography with the viewer, (iv) share a common characteristic or bond (e.g. same alumni association), or (v) deemed by other factors to be relevant to the viewer (as compared to other persons who use the service provided by system 100).

Other information that can be presented on a directory page include reviews and ratings that the particular participant has made of other businesses. Such functionality or features enables the user to enhance his credibility when making a positive review of a business, or when generating a referral link to a business.

In the case when the participant is a business, referral link data that corresponds to instances when that business is referred to by others can be tabulated, or otherwise summarized for presentation on the directory page 500. Among other benefits, such a feature enables the business to promote itself by publishing information that shows who has made a referral of the business.

According to some embodiments, the personally referred rankings is dynamic to the search/filters/criteria that the user selects. For example, if the user is searching using multiple zip codes, a particular Plumber A may rank higher than Plumber B. But if the user just searches a single zip code from the prior multiple set, Plumber B may be more 'personally referred' within that single zip code and thus would rank higher than Plumber B.

Still further, businesses can be motivated to have more and more people 'personally refer them' within each zip code. In case of a "tie" in the rankings, other factors may be used to determine which business will be ranked higher. For example, if both Plumber A and Plumber B are "personally referred" on Jane Smith's "Personal Referral Directory," then whichever plumber is more "personally referred" by others will be ranked higher on Jane Smith's Personal Referral Directory.

As mentioned in various embodiments, there are numerous ways to list businesses: in a search result, personal directory page, or main directory page. Below in Table A is an example of some information which may be provided when businesses are listed for a particular zip code (e.g. as part of the site's main page). Table B is in outline form—on an actual website for such a system, the information may be spaced and organized (with colors, different fonts, etc.) to be easy to see and understand.

TABLE B

| Accountants | Dentist | Electrician | Hair Stylist | Painters |
|---|---|---|---|---|
| 2 12 8 56 | 4 63 439 1563 | 3 4 66 45 | 1 9 547 994 | 3 15 102 231 |
| Acupuncture | Dressmakers | Elevator repair | Insurance | Pharmacies |
| 0 2 65 88 | 0 4 15 43 | 0 1 5 8 | 6 18 394 3459 | 2 12 87 453 |
| Baker | Drug Stores | Engravers | Jewelry | Plumbers |
| 0 6 50 62 | 0 5 167 443 | 0 2 37 85 | 0 6 141 743 | 3 32 222 431 |
| Barbers | Dry Cleaners | Fence | Limousines | Psychiatrists |
| 0 3 85 448 | 0 23 753 1562 | 0 12 56 68 | 0 2 226 441 | 0 7 12 18 |
| Beauty Salon | Dumpster | Financial | Loans | Restaurant |
| 0 23 457 665 | 0 2 56 81 | 2 150 431 | 3 87 563 673 | 18 67 689 732 |

The numbers provided underneath the type of business indicate specific information available about the business or group of business. For example, the first number can indicate the number of subcategories in the business area, the second number can indicate the total number of businesses of that category within the search area, the third number can be the total number of the user's friends/associates who have personally recommended businesses in the category and within the search area, and the fourth number can be the total number of the user's friends/associates who have reviewed businesses in the category and within the search area. Table C breaks down the numerical content of Table B:

| Category | # of sub Categories | Total # of Businesses within search criteria | # of your friends pages that personally refer in this category within search criteria | # of your friends that Rated/reviewed Businesses in this Category within Search criteria |
|---|---|---|---|---|
| Painter | 3 | 15 | 102 | 231 |
| Pharmacies | 2 | 12 | 87 | 453 |
| Plumbers | 3 | 32 | 222 | 431 |
| Psychiatrists | 0 | 7 | 12 | 18 |
| Restaurants | 18 | 67 | 689 | 732 |

With reference to Table B and Table C, the information can be condensed in the main directory page to show something much shorter, such as:

| Psychiatrists | 1 7 12 18 |
|---|---|

The content accompanying the values may be formatted with, for example, logos, symbols, and icons.

When such listings are presented (e.g. on a main page), user can also click on the particular category (e.g., "plumbers") on the main directory page to be taken to a display having more detailed information about businesses in the category, such as a map showing the plumber locations, as well as further information regarding the reviews/recommendations. As an example, if a user were to click on the "plumbers" label, one could be taken to a webpage listing including a dropdown breaking the plumbers category into subcategories, as depicted below in Table D:

TABLE D

| Plumbers 3 32 222 | | | |
|---|---|---|---|
| Subcategories | # businesses | # friends recommended | # friends reviewed |
| Commercial | 18 | 65 | 100 |
| Industrial | 8 | 14 | 36 |
| Residential | 6 | 143 | 295 |

If a user clicks on "RESIDENTIAL" under plumbing, the following type of information can be presented to the user, as shown in Table E below:

TABLE E

| Plumbers: Residential 6 | Total # of pages the business is personally referred on | Overall average user rating | # of your friends that personally refer this business | # of your friends that rated this business | Your Friends Average user rating |
|---|---|---|---|---|---|
| z-best plumbing | 150 | 4.7 | 56 | 68 | 4.9 |

TABLE E-continued

| Plumbers: Residential 6 | Total # of pages the business is personally referred on | Overall average user rating | # of your friends that personally refer this business | # of your friends that rated this business | Your Friends Average user rating |
|---|---|---|---|---|---|
| Joes Plumbing, Inc | 87 | 4.3 | 30 | 39 | 4.1 |
| Abc plumbing | 18 | 2.1 | 0 | 7 | 1.6 |
| Roter rooter | 587 | 3.9 | 60 | 65 | 4.5 |
| Redondo Plumbing | 119 | 4.4 | 68 | 104 | 4.9 |
| Bobs Plumbing | 119 | 4.4 | 68 | 104 | 4.9 |

Businesses that pay for premium placement (e.g. see an embodiment of FIG. 6) may be provided in bold.

The rankings can be shown condensed in the directories in a format such as depicted below in Table F:

TABLE F

Plumbers:
Residential 6:

| | | | | | |
|---|---|---|---|---|---|
| z-best plumbing | 150 | 4.7 | 56 | 68 | 4.9 |
| Joes Plumbing, Inc | 87 | 4.3 | 30 | 39 | 4.1 |
| Abc plumbing | 18 | 2.1 | 0 | 7 | 1.6 |
| Roter rooter | 587 | 3.9 | 60 | 65 | 4.5 |
| Redondo Plumbing | 119 | 4.4 | 68 | 104 | 4.9 |
| Bobs Plumbing | 119 | 4.4 | 68 | 104 | 4.9 |

The table lists examples of premium services and/or other upgrades that can be implemented through a system such as described with system 100. Each service identified below nay be associated with a charge (e.g. an amount that needs to be paid by the Participant who elects to have the feature) and a reward. The reward may include revenue sharing, such as described with an embodiment of FIG. 6.

Numerous types of functionality can be incorporated into a referral/social network such as described with an embodiment of FIG. 1. In one embodiment, system 100 is configured to permit participants (or registered users) to receive a reward for enrolling other individuals to register and become participants.

In one embodiment, a registration referral tool is integrated and provided with a service of system 100. The registration referral tool 150 enables users to register and become participants, and the tool may incorporate additional functionality to enable persons to register and credit another participant for their enrollment. In one embodiment, the registration tool 150 is published on the web page or online resource of individual participants. Unregistered users may view the page, and elect to use the tool 150 to enroll. Because a participant enrolls from the web page of another participant, the system credits the existing participant with enrolling the new participant. The new participant may be unaware that the existing participant was given credit for his or her enrollment. The credit to the existing participant may be provided in various forms, including by reward, prize, coupons, or even monetary compensation. In some implementations, the reward is a one-time reward, such as a fixed credit. In a variation, the reward is ongoing, such as a percentage of the revenue generated for the network by the newly enrolled participant. The reward may also include a percentage of the revenue generated for the network by the newly enrolled participant (e.g. percentage of revenue generated from those persons that the newly enrolled participant subsequently enrolls).

Still further, some embodiments provide for system 100 to charge participants for premium services. In particular, business participants can elect to pay or subscribe for services that are not available to non-premium registered users, or to unregistered users. In one embodiment, a premium service can include listing a business participant in a directory page for each have a set number of participants. With reference to an embodiment of FIG. 5, a premium listing can be presented in a registered participant's directory page as a link that is integrated (e.g. placed adjacent to) with referral links of that participant. In this way, functionality for browsing and searching the directory of the Cuban participant includes listing those referral links and premium links (links to businesses that pay for inclusion in directory pages).

Other examples of premium services include enabling business participants to perform marketing and campaign functions such as run online surveys (e.g. on their webpage, or with service as a whole) and publish select types of promotional content, such as coupons.

Affiliate Programs

One example of an affiliate program is to pay registered participants a referral fee for referring other businesses/consumers to a service of system 100. For example, if a Member A refers Member B to the service, and Member B joins and also pays for upgrades or premium content/services, then Member A will receive a portion of the payments received by the Referral Network from Member B. The affiliate program may be multi-level, so that different businesses received different percentages of payments, based upon the referring business's status on the Referral Network.

In one example, Member A is a "free" member who does not pay for any additional/enhanced services from the network, Member B joined the Referral Network as a referral of Member A, and Member C joined the Referral Network as a referral of Member B. Member A can receive a first percentage, such as 8%, of anything that Member B pays to the network, and Member A will receive a second percentage (lower than the first percentage), such as 4%, of anything that Member C pays to or through the service of system 100.

If Member A is a premier/premium member of the service, then the percentages paid are higher. For example, Member A may receive 24% of anything that Member B pays to the network, and 12% of anything that Member C pays to the service.

In another embodiment, for Member A to receive the higher rate payment from Member C, Member B would also have to be a premier/premium member.

In another embodiment, Member A can receive the corresponding rate of pay from Member C regardless of what Member B does.

In another embodiment, Member A can receive the referral fee from Member C even if Member B is no longer participating in the service.

When an Individual, Business, or Group (i.e., the registered user, aka "Member") joins the network and establishes a personal directory page thereon, it can inform (via an information transmission, e.g., email or other electronic data transmission, which can be provided via the network) information about its new personal directory webpage to its friends/customers/other associates. For example, with the personal directory webpage established, the system 100 may ask the registered user if it wants to forward invitations to join the network to friends/customers of the registered user. The network can automatically generate such emails (which may also be capable of modification by the registered user prior to sending), and the emails may include invitational language such as "sign up free on my personal directory page so that I can personally refer you to all my other friends etc." The emails may also include information specific to the invitees business, such as "you can be my personally referred plumber" (or hairdresser, or Mexican restaurant, etc.)

Registered users which join the network can send such auto information transmission to their clients, friends, family, etc. and ask them (e.g., by auto email) to go to the registered user's personal directory webpage to learn about the business, and also to sign up for the network for free. The auto information transrnission/emails may ask the recipients to personally recommend the business to others, and/or to provide reviews on the business.

The business and registered users which joined the network may be granted "status" based on the number of reviews and the number of people/businesses who "personally recommend" the business.

The income model may include one or more of the following: PPC (Pay Per Click), Business services/upgrades, Group services/upgrades, Individual services/upgrades, High profile pages, Partnering with Service Providers, and Future modules and services.

According to some embodiments, an affiliate program may be implemented to incentivize participants to generate revenue for system 100 by enabling participants to share in the revenue that they generate.

Figure 6:
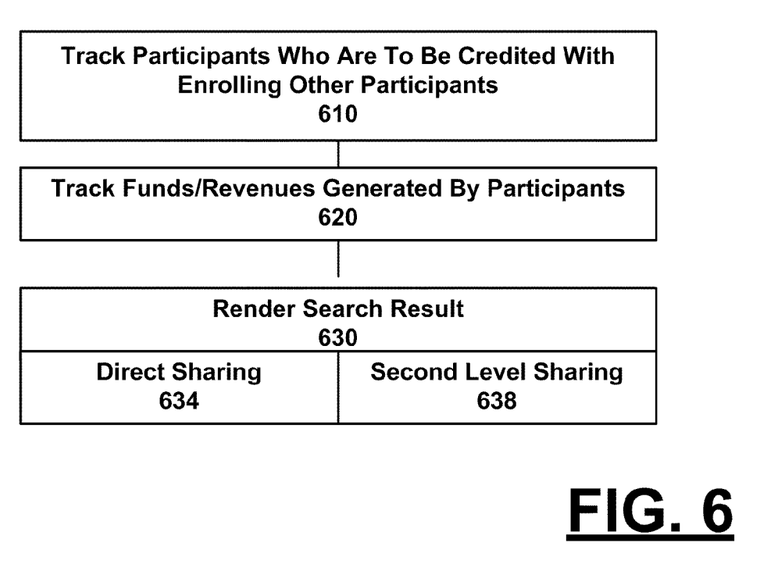
FIG. 6 illustrates a method for implementing a multilevel affiliate program, under an embodiment.

FIG. 6 illustrates a method for implementing a multilevel affiliate program, under an embodiment. A participant may trigger, influence or otherwise cause another participant to register with system 100.

With further example to an embodiment of FIG. 1, web pages of participants can include the participant tool 150. Those participants that have traffic, or visitors, can expect to receive more users enrolling with system 100 using the registration tool 150 provided on their web page. As an alternative or variation, system 100 may prompt an enrollee to identify one or more other participants who influenced their decision to join system 100. The affiliate program 160 of system 100 may track which participants are to be credited for enrolling other participants (610).

When participants generate for system 100 (e.g. purchase premium services), functionality on system 100 tracks the funds (620). In one embodiment, the affiliate program 160 interfaces with information and data maintained by the premium services 150 in order to continuously or repeatedly determine which participants are expending monies on system 100 in exchange for premium services and/or functionality. For example, the affiliate program may run a roster each week, or each month, to participants that are enrolled in premium services. Other forms of revenue generation can also be tracked. For example, business participants can purchase rights to run online surveys, purchase information for marketing campaigns etc. As another example advertisement revenue generated through click-thrus on the individual webpages can be estimated or calculated.

Once revenue generation is determined, a revenue-sharing algorithm or scheme may be implemented to distribute a portion of the generated revenue to participants as the credit or reward for their influence in the enrolling other participants (630). In one embodiment, the affiliate program implemented for revenue-sharing is multilevel, and more specifically, two-level. For a given participant ALPHA, a tabulation is made for all revenue generated by those participants BETAS that participant ALPHA directly influenced to enroll (634). This may correspond to, for example, those participants that enrolled in the service through the directory page of participant ALPHA.

Next, a tabulation is made for all revenues generated by those participants that were directly influenced to enroll in the service of system 100 by the participant BETAS (638) (i.e. those participants who were directly influenced in enrolling by participant ALPHA).

System 100 may have signed a first fractional portion of revenue generated by step 634, and a second fractional portion of revenue generated by step 638. In implementation, the first fractional portion is greater than the second fractional portion. In fact, the first fractional portion can be a multiple of the second fractional portion.

The revenue generation determination may be paid on a periodic basis (e.g. monthly, semi-annually). Once the revenue generation determination is made, portions of the revenue can be credited to the participants for their enrollment influence and activities. In this way, the growth of system 100 is partially fueled by the activities of the participants that enrolled with system 100.

Table G lists examples of premium services and/or other upgrades that can be implemented through a system such as described with system 100. Each service identified below nay be associated with a charge (e.g. an amount that needs to be paid by the Participant who elects to have the feature) and a reward. The reward may include revenue sharing, such as described with an embodiment of FIG. 6.

TABLE G

List Upgrades/Premium Services

| UPGRADE | DESCRIPTION |
| --- | --- |
| Auto-Populate per zip code (each) | A business pays to be listed on a population of participants directory page (except group pages) within a zip code or other geographic identifier. These businesses will be under the 'Personally Referred' businesses of the page owner if any exist on the page. |
| Auto-Populate 5 pack of zip codes | Same as above but a 5-pack of zip codes |
| Auto-Populate 15 pack of zip codes | Same as above but a 15-pack of zip codes |
| General Search Zip Code (each) | Where a business pays to be 'found/listed' in general search results in more zip codes than their main primary zip code |
| General Search Zip Codes 5 pack | Same as above but a 5-pack of zip codes. Other pack sizes possible. |
| General Search Zip Codes 15 pack | Same as above but a 15-pack of zip codes. Other pack sizes possible. |
| General Search Zip Codes 50 pack | Same as above but a 50-pack of zip codes. Other pack sizes possible. |
| Multiple Category Placement (each) | Where a business pays to be 'listed/found' in more "categories" in the network directory |
| Multiple Category Placement 5 pack | Same as above but a 5-pack of Categories. Other pack sizes possible. |
| Multiple Category Placement 10 pack | Same as above but a 10-pack of Categories Other pack sizes possible. |

TABLE G-continued

List Upgrades/Premium Services

| UPGRADE | DESCRIPTION |
| --- | --- |
| Additional Search Terms/Keywords (each) | Where a business/group may pay to have more search terms 'linked' to his business/group so that the business/group may be more easily found when a user searches the directory database |
| Additional Search Terms/Keywords 5 pack | Same as above but a 5-pack of Search Terms |
| Additional Search Terms/Keywords 10 pack | Same as above but a 10-pack of Search Terms |
| Bold listing | Business pays to be listed in BOLD in the directory searches |
| Premium Directory Placement (moved to top of non-personally referred list) | Businesses pay to be "moved to the top" of the "non-personally referred" list on the users directory pages. These businesses will still be Under the "Personally Referred" businesses of the page owner |
| Premium Search Placement (be at the top of search lists) | Businesses pay to be in a "premium" section of the general "Search Results Page" |
| Meta Tags | Businesses pay to be able to add Meta Tags to their page to enhance SEO for them |
| Customize user Directory (remove unwanted listings from user directory) | Allows all registered users to be able to remove unwanted businesses that were "Auto-Populated" into their directory |
| Post/Publish events to the calendar | Allows registered users to put events on the public calendar for everyone to see |
| Video commercial/ad for user's profile | Allows registered users to post videos to their page |
| Reverse Search (see what the rater has said about other businesses) | Allows registered users to cross reference ratings. To be able to see all other ratings/reviews posted by a specific registered user |
| SMS text notifications | Enables users to send SMS texts directly to registered users |
| View only 'Personally Referred' businesses option (where a user can upgrade so that when it views an entity's personal web page the user can limit the business referral/ratings/review information to only the business's which were personally referred by that entity) | Allows registered user to 'filter out' all other businesses and easily see only the 'personally Referred' businesses in another registered users directory (where a user can upgrade so that when it views an entity's personal web page the user can limit the business referral/ratings/review information to only the business's which were personally referred by that entity) |

According to some embodiments, a reward module 170 can be implemented to promote interaction by participants with a service of system 100. In one embodiment, a reward module is implemented by one or more processes, executed as part of system 100, which (i) monitor or detect certain kinds or types of activities performed by users, and (ii) provide a reward for individuals who perform those activities.

In an embodiment, a user is provided a coupon as a reward, in exchange for performing an activity (e.g. completing a survey, writing a review, enrolling another user or set of users etc.). In one embodiment, participants that rate and/or review businesses will receive a code to redeem a reward or prize from a prize pool 172. For example, the prize pool 172 may select for, or enable the user to select, a coupon to a business or service. The participant is able to pick whichever reward the user wants from the pool.

Still further, a business/group can submit a coupon/reward to the prize pool 172. The coupon/reward goes into a global coupon pool (cue) to be potentially used by any user. This "coupon/rewards pool/cue" can be organized (e.g., searched by/sorted by) zip code, area, type of coupon, and/or food, service, industry, doctor, company name, hardware, plumber, etc., by the user looking to redeem a coupon or otherwise select a reward from the pool/cue (e.g., as a reward for having left a business review).

In one embodiment of an Instant Rewards program, users have to claim the coupon/reward immediately or within a set time frame (e.g., within 7 days). The program may include feedback as to which business's rewards are the most popular with users. Such feedback may be for limited distribution (e.g., only businesses in the pool will know the breakdown of the percentage of rewards from one or more of the businesses), or may be more widely available (e.g., users will be able to see which rewards/coupons are the most popular, and which businesses have the most popular rewards/coupons).

In one embodiment, the reward module 170 includes an interface 174 for business participants to submit rewards and prizes. Additionally, the reward module 170 permits businesses to see what other companies are offering for rewards/coupons, and the program will thus encourage each business to compete for users to pick rewards/coupons from that business as opposed to other business's rewards/coupons.

As an addition or variation, a reward module entails a user being given credits in exchange for the user performing certain activities (e.g. writing reviews). The use of credits (or alternatively points) can also serve to provide larger rewards to those users that have performed the most or the best in terms of specific activities (e.g. "top rater" or "top user"). The reward module 170 includes a registered user credit program, with varying points/credits provided depending on the nature/number/etc. of the reviews provided by the registered user. As an example: (i) if the registered user does a standard rating/review, the registered user may receive one user credit; (ii) if the registered user does an upgraded/industry specific rating and/or review, the registered user may receive one or more additional user credits; and (iii) if the registered user does a customized company specific rating/review, the registered user receives two or more additional user credits.

Another example of how a reward program may be implemented by the reward module 170: (i) for every ten friends the registered user adds, the registered user gets one or more credits; (ii) for every new business/group that initially registers with the system through the participant, the participant user gets one or more credits. For every new individual that initially registers with the system through the registered user, participant gets one or more credits. For every rating/review a business/group gets, the business-participant gets or more credits The reward module 170 may also implement a program that presents a "leader board", listing the participants that provide the most ratings and/or accumulating the most user credits. These listed participants can be recognized by being listed on the "top raters" list, and further rewarded with special rewards/prizes (which may be donated by businesses). The listed "top users" can be sorted by city, locale, county, state, country, type of business, or various other categories.

In addition to programs for participants, separate reward programs can be implemented to track, recognize, and reward participants who leave the most (in number, e.g., in total or in category) ratings for businesses. For example, Registered User Awards may be given to participants who rate $1^{st}$, $2^{nd}$, $3^{rd}$, etc., place in states, nationally, localities, etc. in terms of the number of business ratings provided by each participant. The top ranked participants for a specific time period (e.g., month, quarter, year, etc.) are provided with recognition and/or special awards in the form of prizes provided by sponsoring businesses. Examples of such awards are free (or discount) dinners, trips, or other free or discounted items. As such, the awards provided under this program may be substantially more valuable than the standard rating review rewards.

As an example, contests to determine top rater(s) and/or "top users" may be conducted every quarter, and/or month, and/or yearly, etc., and may include winners for one or more localities. An overall national and/or global winner can also be determined. Monthly winners can be determined, with the total listing of user credits kept running for the quarterly and/or yearly winners, so that there could bee smaller monthly winner prizes, bigger quarterly/seasonal winner prizes (winter spring summer fall), and even larger yearly winner prizes based on various metrics of being top/best or one of the top/best.

Still further, some embodiments provide that credits can be rewarded to participants for activities other things in addition to doing ratings/reviews. For example, credits can be provided (i) 1 point for standard review/rating; (ii) 2 to 3 points for industry specific rating/review; (iii) 2 points for every 25 (or other set number) of "friends" the registered user has who are members of the program; (iv) 1 points for every 10 business associate 'friends'; (v) 1 points for every 10 friends that sign up for the overall program through the registered user's page; and (vi) 3 points for every 10 businesses that sign up for the overall program through the registered user's page.

As another example, a business owner may broadcast (via email, etc.) the availability of the coupon, or the coupon itself, to his followers or can advertise a prize (e.g. coupon) availability on his news feed to his friends/followers.

Still further, business participants can compete to add to the "User Contest" winners' pool with bigger prizes, and the businesses participant which provide more, bigger, better, and/or more valuable prizes may be acknowledged with additional advertising, or premium services. The winners' pool prizes are provided to the local, regional, statewide, and/or national winners, which can be determined for first, second, and/or third place, etc.

As further examples, prizes can be granted on a monthly/quarterly/yearly or otherwise, for meeting prize thresholds or standards (e.g. first, second, third, etc. place on a local, regional, statewide, or national level). The credits can thus add up to very large/valuable prizes, including discounts (coupons) or free goods/services.

In another embodiment, the top raters/participants in the "Registered User Credits" program may earn 'status' 'ranking', such as the following potential categories (or other criteria): (i) how many ratings they have done (standard, industry specific, custom); (ii) how many businesses, they personally sign up through their page; (iii) how many friends personally sign up through their page; (iv) how many business associates/friends individual participants have; and/or (v) how many friends individual participants have.

Still further, there may be one or more extra criteria for the ratings list to use to "verify" that the user has actually used the business that the user is rating/reviewing. For example, a service provided by system 100 may require the user to 'Click to Check the Box' (such as a big green check mark) to affirm that the user actually used this business. The user may also be prompted to provide further details of the user's use of the business, such as entering the date the user used the business. Further verification may be requested, either immediately or at a later time, such as where a business contests that the user did not actually do business with the business. Such further verification may include submission of a receipt and/or the entry of detailed information regarding the date, time, brief description of the transaction.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for promoting organizations on a social network environment, the method being implemented by one or more computers and comprising steps of:

associating each organization in a plurality of organizations with a corresponding network resource, the network resource of each organization providing a medium on which that organization can provide information about itself and/or its products or services;

associating each participant in a population of participants of a social network with a corresponding network resource;

enabling each individual organization in the plurality of organizations to request a referral link from each of (i) individual participants in the population who have a relationship with the organization, and/or (ii) other organizations;

storing information that identifies (i) the plurality of organizations, (ii) individual participants in the population, and (iii) links between each of the plurality of organizations and individual participants in the population and/or other organizations in the plurality of organizations, wherein the links between each of the plurality of organizations and the individual participants include referral links;

enabling publishing of the referral links to communicate an affirmation by the referring organization or participant for the referred organization, each referral link including a data structure linking the referring organization or participant to a network resource of a referred organization;

enabling a given participant to specify, as search criteria, at least (i) a first criterion of information that identifies a type of organization, and (ii) a second criterion that identifies a person or class of persons who are the referring participant of a referral link in which a business of the type is the referred organization;

performing a search by:
  determining one or more organizations that satisfy at least the first and second criterions;
  determining at least a first organization from the one or more organizations which satisfy at least a third criterion of having a referral link from a referring party that has a common geographic characteristic with the given participant; and
  returning, as a search result, an identifier for at least the first organization.

2. The method of claim 1, wherein the data structure of each referral link is published with a network resource of either a referring organization in the plurality of organizations or a referring participant in the population.

3. The method of claim 1, wherein returning the search result includes presenting a ranked listing of organizations, including identifying, from the plurality of organizations, a set of organizations that are of a particular category, wherein the ranked listing is based at least in part, for each organization in the list, on a tally of individuals who are referring participants of referral links that have that organization as the referred organization.

4. The method of claim 1, wherein the given participant is a viewer of the list, and wherein returning the search result includes determining information about the viewer of the list, and wherein returning the search result further comprises incorporating data about referral links that are made to businesses in the list in which the referring participant is an individual who is pertinent to the viewer.

5. The method of claim 4, wherein determining information about a viewer includes determining one or more participants who are socially linked to the viewer and wherein returning the search result further comprises incorporating data about one or more referral links in which the referring participant is the one or more participants who are socially linked to the viewer.

6. The method of claim 4, wherein determining information about a viewer includes determining one or more participants who have a common classification with the viewer, and wherein returning the search result further comprises incorporating data about one or more referral links in which the referring participant is the one or more participants who have the common classification with the viewer.

7. The method of claim 1, wherein determining the one or more organizations that satisfy at least the first and second criterions comprises using the search criteria to identify, from the stored information, one or more organizations that are of the type specified in the search criteria and which are the referred organization for a referral link in which the person or class of persons are the referring participant.

8. The method of claim 1, wherein returning the search result further comprising presenting a dynamically ranked listing.

9. The method of claim 1, wherein returning the identifier for at least the first organization comprises presenting the identifier for at least the first organization as part of a list of business organizations, and wherein the identifier for at least the first organization is presented in prominence.

10. The method of claim 9, wherein the list of business organizations include a first set of business organizations which satisfy the first and second criterions but do not satisfy the third criterion, and wherein the identifier for at least the first organization is presented in prominence by presenting the list includes so that the identifier for at least the first organization is prominent relative to the first set of business organizations.

11. The method of claim 9, wherein the identifier is presented in prominence by presenting a tally of referral links for the at least first organization.

12. The method of claim 9, wherein the identifier is presented in prominence by modifying a font effect for the identifier.

13. The method of claim 9, wherein the identifier is presented in prominence by displaying content indicating different levels of prominence.

14. The method of claim 1, wherein the network resource assigned to each organization or each participant is a web page.

15. A system for promoting an organization on a user-content generated network, the system comprising:
  a database system that stores information that identifies participants of the user-content generated network, the participants including persons and businesses, wherein the database system stores information that also includes link data that identifies participant specified links between participants of the user-content generated network;
  one or more modules that communicate with the database system in order to:
  publish content specified by individual participants; and
  include, as part of the published content, one or more referral links, the one or more referral links being specified by referring participants that are persons and linking to referred participants that are organizations, the one or more referral links being provided with context to indicate the participant person's recommendation or endorsement of the business that is being linked with the referral link;
  enable a given user to specify, as search criteria, at least (i) a first criterion of information that identifies a type of organization, and (ii) a second criterion that identifies a person or class of persons who are the referring participant of a referral link in which a business of the type is the referred organization;
  perform a search by:
    determining one or more organizations that satisfy at least the first and second criterions;
    determining at least a first organization from the one or more organizations which satisfy at least a third criterion of having a referral link from a referring party that has a common geographic characteristic with the given participant; and
    returning, as a search result, an identifier for at least the first organization.

16. The system of claim 15, wherein the one or more modules are configured to enable users of the network to perform a referral search for a business by specifying, as search criteria, (i) information about the business, and (ii) information about referral links.

17. The system of claim 16, wherein the information about referral links include information that identifies a person, or a class or group of persons, who has or have recommended businesses of a particular type or characteristic.

18. The system of claim 16, wherein the information about referral links include information that identifies a business of a particular type or characteristic that has received a threshold quantity of referral links from participants of a particular class.

19. A non-transitory computer-readable medium that stores instructions, including instructions that when executed by one or more processors, cause the one or more processors to perform steps comprising:
- associating each organization in a plurality of organizations with a corresponding network resource, the network resource of each organization providing a medium on which that organization can provide information about itself and/or its products or services;
- associating each participant in a population of participants of a social network with a corresponding network resource;
- enabling each individual organization in the plurality of organizations to request a referral link from each of (i) individual participants in the population who have a relationship with the organization, and/or (ii) other organizations;
- storing information that identifies (i) a plurality of organizations, (ii) individual participants in the population, and (iii) links between each of the plurality of organizations and individual participants in the population and/or other organizations in the plurality of organizations, wherein the links between each of the plurality of organizations and the individual participants include referral links; and
- enabling publishing of the referral links to communicate an affirmation by the referring organization or participant for the referred organization, each referral link including a data structure linking the referring organization or participant to a network resource of a referred organization;
- enabling a given participant to specify, as search criteria, at least (i) a first criterion of information that identifies a type of organization, and (ii) a second criterion that identifies a person or class of persons who are the referring participant of a referral link in which a business of the type is the referred organization;
- performing a search by:
  - determining one or more organizations that satisfy at least the first and second criterions;
  - determining at least a first organization from the one or more organizations which satisfy at least a third criterion of having a referral link from a referring party that has a common geographic characteristic with the given participant; and
  - returning, as a search result, an identifier for at least the first organization.

* * * * *